United States Patent

Lee et al.

[11] Patent Number: 5,949,546
[45] Date of Patent: Sep. 7, 1999

[54] INTERFERENCE APPARATUS FOR MEASURING ABSOLUTE AND DIFFERENTIAL MOTIONS OF SAME OR DIFFERENT TESTING SURFACE

[75] Inventors: Chih-Kung Lee, Taipei; Giin-Yuan Wu, Taipei Hsien; Wen-Jong Wu, Chungho; Kun-Sheng Yeh; Chin-Fa Lee, both of Taipei, all of Taiwan

[73] Assignee: AHEAD Optoelectronics, Inc., Taipei, Taiwan

[21] Appl. No.: 08/856,283

[22] Filed: May 14, 1997

[51] Int. Cl.$^6$ ................................................ G01B 9/02
[52] U.S. Cl. ................................ 356/351; 356/357
[58] Field of Search ............................. 356/4.09, 28.5, 356/349, 351, 357, 358, 72; 73/655, 657

[56] References Cited

U.S. PATENT DOCUMENTS

| | | | |
|---|---|---|---|
| 4,798,468 | 1/1989 | Ohuchi | 356/351 |
| 5,280,340 | 1/1994 | Lacey | 356/357 |

*Primary Examiner*—Samuel A. Turner
*Attorney, Agent, or Firm*—Gardere & Wynne, L.L.P.; Sanford E. Warren, Jr.

[57] ABSTRACT

An interference apparatus is disclosed wherein the high-visibility quadrature interference signals are obtained by making a pair of polarization beamsplitter, a 45-degree oriented quarter-waveplate and four light-beam detected photodiodes. A three-dimensional interference optical configuration is made. The test-surface light beam and reference light beams are traveled on this optical configuration. The test-surface light beam and reference light beams have orthogonally linearly polarization state with each other. After they pass through the quarter-waveplate, one right circularly polarized light beam and one left circularly polarized light beam are produced. The vector sum of these two circularly polarized light beams is again a linearly polarized light beam which is then divided into two light beams by a non-polarization beamsplitter. A pair of polarization beamsplitters, whose axes are 45 degrees apart, are utilized to create the 90 degrees phase difference of the light beam intensity signal measured at the photodiodes.

15 Claims, 4 Drawing Sheets

INTERFERENCE APPARATUS FOR MEASURING ABSOLUTE AND DIFFERENTIAL MOTIONS OF SAME OR DIFFERENT TESTING SURFACE

BACKGROUND OF THE INVENTION

1. Field of the Invention

The present invention relates to a vibrometer and interferometer device for metrology measurement and, more particularly, to a laser Doppler interferometer device to be called "AVID" which stands for Advanced Vibrometer/Interferometer Device herein.

2. Description of the Prior Art

Laser Doppler vibrometer and interferometer devices have been used in various metrology areas. Their applications in the direct access storage device (DASD) area have certainly been practiced for a long time. However, an optical system that can be easily miniaturized so that accurate measurements can be obtained while the optical system is traversed with the measurement objects has not been readily available. The need to develop such a system is significant for optical glide technology since slider vibrations and slider/disk spacings need to be measured as a slider transverses across a disk surface.

FIG. 1 shows a conventional optical arrangement on an optical unit applying a basic principle of a Michelson interferometer device. A collimated light from a visible diode laser 10 passes through an aperture mirror 16 and then is split into two interfered arms by a polarization beamsplitter PBS1 20. A first light beam 1 and a second light beam 2 each possesses an orthogonal polarized state respectively. In a conventional example shown in FIG. 1, two outgoing light beams are linearly polarized. The first light beam 1 passes through two 45-degree reflective mirrors 22, 24 arranged side by side and a polarization beamsplitter PBS2 30, and then it is focused to a point on a test target by a doublet focusing lens L1 26. The second light beam 2 passes through two 45-degree reflective mirrors 32, 34 arranged side by side and the polarization beamsplitter PBS2 30, and then it is focused to a point on the test target by another doublet focusing lens L2 36. The two outgoing light beams and two returning object beams are off-axially incident to different positions on the two focusing lenses L1 26 and L2 36, The two returning object beams remain linearly polarized and are orthogonal with respect to each other after they are recombined at PBS1 20. One right circularly polarized light beam and one left circularly polarized light beam are generated after the two returning object beams traverse a quarter waveplate QW 45 oriented at 45 degrees. The sum vector of the two circularly polarized light beams is still a linearly polarized light beam but with an inclined angle relative to a horizontal axis due to the movement of an object. Then the resultant linearly polarized light beam is divided into two interfered light beams by a non-polarization beamsplitter NPBS 50. Two polarizers P1 52 and P2 54, whose axes are 45 degrees apart, are utilized to make the 90-degree phase differences of the light intensities measured at respective photodiodes PD1 62 and PD2 64 ideal. Velocity and position signals can be easily decoded by using the signal processing schemes. The two returning object beams E1 and E2 can be expressed as $$E_1 = \begin{bmatrix} 1 \\ 0 \end{bmatrix} e^{i2\pi(f_1+f_{d1})t}$$

and $$E_2 = \begin{bmatrix} 0 \\ 1 \end{bmatrix} e^{i2\pi(f_1+f_{d2})t+\phi}$$

where $f_1$ is the light wave frequency; and $f_{d1}$ and $f_{d2}$ are the Doppler shifted frequencies created by the motion of the two object surfaces 1 and 2, respectively; and $\phi$ is the relative phase difference between the two object beams E1, E2 generated from the optical path differences and phase angle variations due to reflections, etc. After the two object beams E1, E2 pass through the quarter waveplate QW 45 the combined light vector can be expressed as follows:

$$E\left\{\begin{bmatrix} 1 \\ i \end{bmatrix} e^{i2\pi f_{d1}t} + \begin{bmatrix} i \\ 1 \end{bmatrix} e^{i2\pi(f_{d2}t+\phi)}\right\} e^{i2\pi f_1 t}$$

which is the coherent sum of the two circularly polarized light beams, one is right circularly polarized and one is left circularly polarized, and can be viewed as a linearly polarized light beam with its polarization axis located at $[2\pi(f_{d1}-f_{d2})t+\phi]/2$. In order to perform a quadrature measurement to remove directional ambiguity, a method similar to the Pocket Servowriter Project approaches can be adopted. That is, the two polarizers P1 52, P2 54 whose axes are 45 degrees apart can be used as shown in FIG. 1 to make the light intensity measured at respective photodiodes PD1 62, PD2 64 be expressed as $$I_1 \; 1+\sin(2\pi(f_{d1}-f_{d2})t+\phi)$$

and $$I_2 \; 1+\cos(2\pi(f_{d1}-f_{d2})t+\phi)$$

If a standard quadrature signal detection technique is performed to the above two signals, a relative position between the two object surfaces can be obtained in real time. In DASD applications, this setup gives the clearance measurement, which can be used to set the clip level in glide. A versatile differential laser interferometer is then created. Furthermore, if the electric signals from the photodiodes PD1 62 and PD2 64 are mixed with a cosine signal and a sine signal which are electronically generated with frequency $f_c$ separately, the following can be obtained.

cosine channel: $\cos[2\pi(f_{d1}-f_{d2})t+\phi]\cdot\cos(2\pi f_c t)$ $=\frac{1}{2}\{\cos[2\pi(f_d+f_c)t+\phi]+\cos[2\pi(f_d-f_c)t+\phi]\}$, and sine channel: $-\sin[2\pi(f_{d1}-f_{d2})t+\phi]\cdot\sin(2\pi f_c t)$ $=\frac{1}{2}\{\cos[2\pi(f_d+f_c)t+\phi]-\cos[2\pi(f_d-f_c)t+\phi]\}$, where $f_d=f_{d1}-f_{d2}$ is the relative Doppler phase shift between the two object surfaces. Summing these two signals yields $\cos\{2\pi(f_{d1}-f_{d2})t+\phi\}$. Sending this signal into a simple frequency-to-voltage converter will yield a velocity signal due to the Doppler effect. This is the fundamental configuration of the conventional laser Doppler vibrometer and interferometer. Thus, both velocity and displacement measurements can be performed thereon.

To satisfy the stringent demands of today's ultra-high performance machinery such as optical/magnetic disk drivers, digital video disk drivers, etc., an interferometer device with high accuracy and wide bandwidth is becoming an essential metrology tool. Comparing the present invention with the conventional optical metrology instruments, several main features are needed for interferometer devices to be adopted into these ultra-high precision high performance machinery measurements. They are: (1) no surface modification to measurement samples, (2) absolute/differential detection, (3) ability to accommodate samples with significantly different reflectivity, (4) nanometer resolutions and (5) a megahertz bandwidth.

SUMMARY OF THE INVENTION

A laser Doppler interferometer device disclosed in this application, not only has the above features but also integrates an optical alignment and imaging projection system and an analog/digital phase demodulating technique, which makes AVID capable of providing more versatile measurements.

Thus, it is a primary objective of the present invention to provide a laser Doppler interferometer for metrology measurement.

In accordance with an aspect of the invention, there is provided a laser Doppler interferometer comprising at least a laser source, a first, a second, a third and a fourth polarization beamsplitter, a non-polarization beamsplitter, a 4% non-polarization beamsplitter, a first, a second, a third and a fourth 45-degree reflective mirror, a quarter waveplate, a doublet focusing lens L1, a doublet focusing lens L2, an optical alignment and imaging projection system, moving devices and a reflective and shift optical device.

In accordance with another aspect of the invention, there is provided a laser Doppler interferometer comprising at least a laser source, a first, a second and a third 45-degree reflective mirror, a first, a second and a third polarization beamsplitter, a non-polarization beamsplitter, a 4% non-polarization beamsplitter, a quarter waveplate, a doublet focusing lens L1, a doublet focusing lens L2, an optical alignment and imaging projection device, moving devices and a reflective and shift optical device.

BRIEF DESCRIPTION OF THE DRAWINGS

The above objective, other features and advantages of the present invention will become more apparent by describing in detail the preferred embodiments thereof with reference to the attached drawings, in which.

DETAILED DESCRIPTION OF THE PREFERRED EMBODIMENT

The present invention provides a laser Doppler interferometer device, AVID, which includes a new designed optical configuration, a flexible mechanical fixture, a built-in optical alignment and imaging projection system for light beam alignment and target positioning, an analog processing of signals for phase and frequency demodulation, in addition to a digital signal phase decoding algorithm.

Optical Configuration

Figure 1:
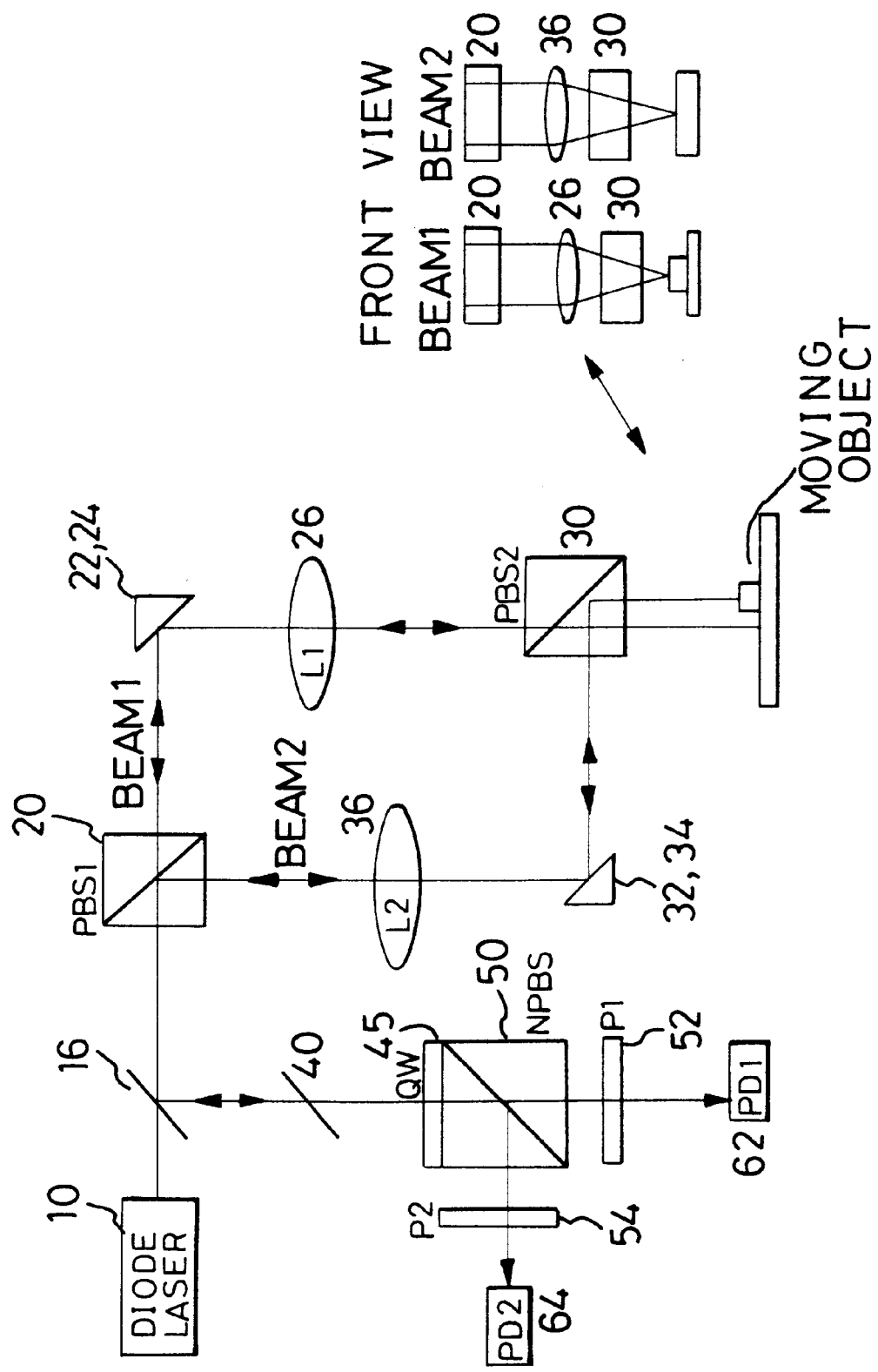
FIG. 1 is a schematic illustration of a conventional vibrometer and interferometer device.
Figure 2:
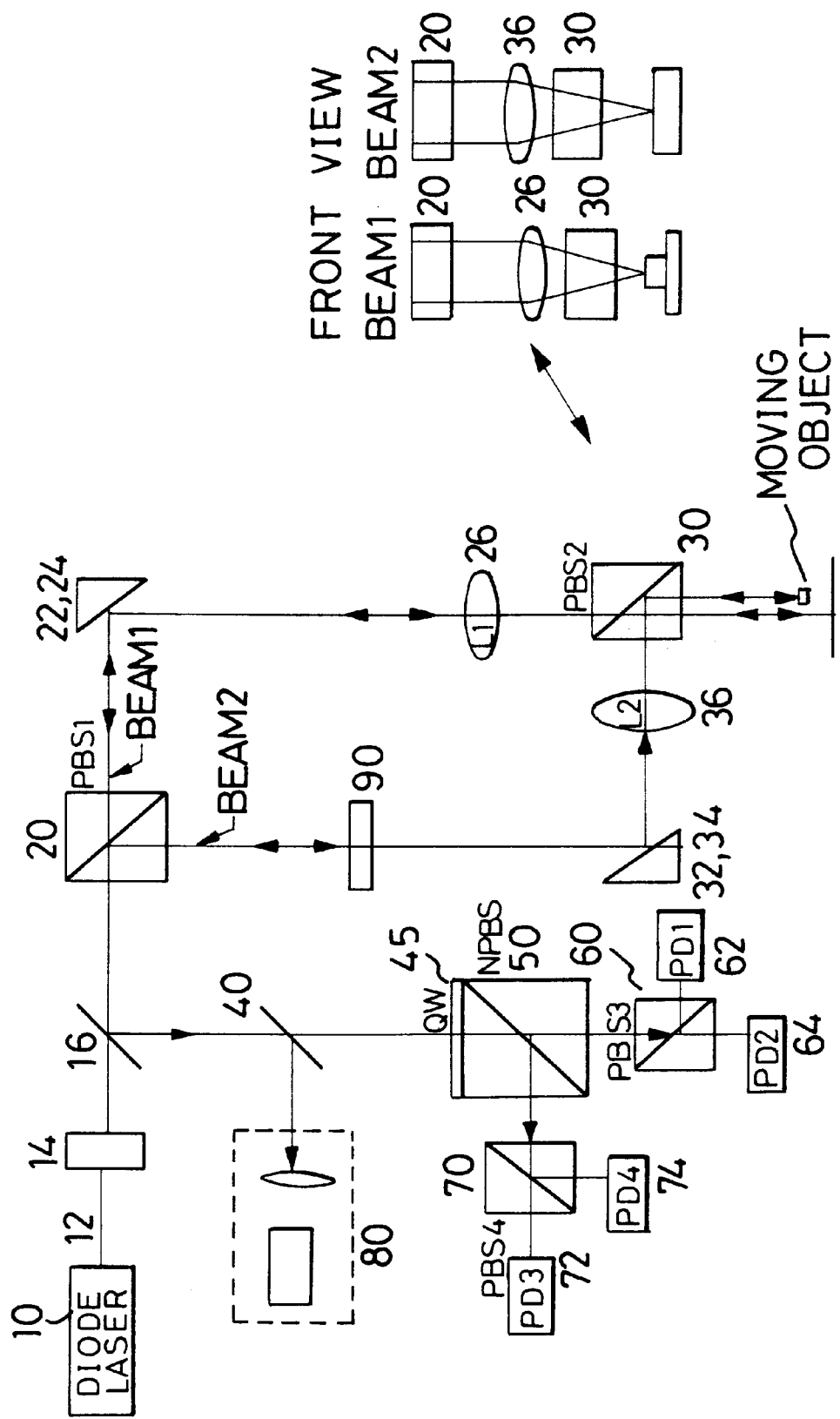
FIG. 2 is a schematic illustration of a laser Doppler interferometer device with a specific configuration in accordance with the present invention.

Referring to a new designed optical configuration shown in FIG. 2, a laser light source, which is installed on a rotatable mount 14, is emitted into an optical unit via an optical fiber 12. An He-Ne laser or collimated light from a visible diode laser 10 is split into two interfered arms by a polarization beamsplitter PBS1 20 through an aperture mirror 16. A first light beam 1 and a second light beam each possesses an orthogonal polarized state respectively. In a preferred embodiment of the present invention, as shown in FIG. 2, the two outgoing light beams are linearly polarized. The first light beam 1 passes through two 45-degree reflective mirrors 22, 24 each attached on a micromovement stage and a polarization beamsplitter PBS2 30, and then it is focused to a point on a test target by a doublet focusing lens L1 26 attached on a micromovement stage. The second light beam 2 passes through two 45-degree reflective mirrors 32, 34 each attached on a micromovement stage and the polarization beamsplitter PBS2 30, and then it is focused to a point on the test target by another doublet focusing lens L2 36 attached on a micromovement stage. The two outgoing light beams and returning object beams are off-axially incident to different positions on the two doublet focusing lenses L1 26 and L2 36. The two returning object beams remain linearly polarized and are orthogonal with respect to each other after they are recombined at PBS1 20. Before the two returning object beams pass through a quarter waveplate QW 45, 4% of the light beam is split by a non-polarization beamsplitter NPBS 40 for light beam alignment use after being reflected to turn 90 degrees through the aperture mirror 16. One right circularly polarized light beam and one left circularly polarized light beam are generated after the two returning object beams traverse the quarter waveplate QW 45 oriented at 45 degrees. The sum vector of the two circularly polarized light beams is still a linearly polarized light beam but with an inclined angle relative to the horizontal axis due to the movement of the object. Then the resultant linearly polarized light beam is divided into two interfered light beams by another non-polarization beamsplitter NPBS 50. Two polarization beamsplitters PES3 60 and PBS4 70, whose axes are 45 degrees apart, are utilized to make the 90-degree phase differences of the light intensities measured at respective photodiodes PD1 62, PD2 64 and PD3 72, PD4 74 ideal. Velocity and position signals can be easily decoded by using the aforesaid signal processing schemes, too.

A rotatable mount 14 for a laser source entry port can make the intensity of the two outgoing light beams (P-polarized and S-polarized) equal, due to the inherently high polarization ratio to the lasers. This rotatable mount 14 also provides a function of precompensating the intensity of the two returning object beams to be equal. Thus the high signal-to-noise ratio for phase decoding can be achieved. From a user's viewpoint, it is not convenient to treat optically the target's surface prior to measurement. The focusing beam configuration allows us to measure objects without the need to create an optical polished surface for the targets. More specifically, any product can be used with this optical configuration. The two focusing lenses L1 26 and L2 36 shown in FIG. 2, which are typical doublets, are used to eliminate this problem. Both lenses L1 26 and L2 36 focus the laser light beams on the target. The returning object beams are reflected with an off-axis configuration to be recollimate by the two lenses L1 26 and L2 36. Therefore, the same wavefront quality with the incident light beams is secured and the phase information will not be destroyed no matter what types measurement surface used. One of the special features of the AVID system is that no acoustic optical modulator (AOM) is found in the optical path, which differs from most of the commercial interferometers. The removal of the AOM can significantly reduce the size of the interferometer and avoid the electromagnetic interference (EMI) effect created by the high frequency signal needed to drive the AOM.

A reflective and shift optical device 90, which is either a corner cube or a prism, is set between the PBS1 20 and the 45-degree reflective mirrors 32, 34 to pass or reflect the light beams to and from between them to form a dual-beam interferometer device or a single-beam vibrometer device respectively by using a single/dual beam change mechanism which will be described later.

Figure 3:
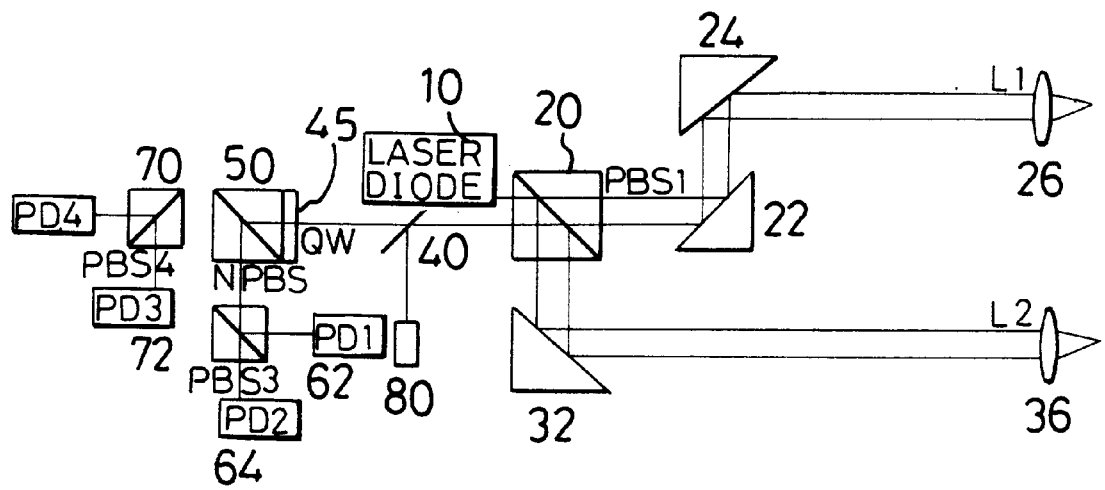
FIG. 3 is a schematic illustration of a laser Doppler interferometer device with another specific configuration in accordance with the present invention.

In another new designed optical configuration shown in FIG. 3, a collimated light from a visible diode laser 10 is split into two interfered arms by a polarization beamsplitter PBS1 20. A first light beam 1 and a second light beam 2 each possesses an orthogonal polarized state respectively. In another preferred embodiment of the invention, as shown in FIG. 3, the two outgoing light beams are linearly polarized. The light beam 1 passes through two 45-degree reflective two mirrors 22, 24 and then it is focused to a point on a test target by a doublet focusing lens L1 26. The light beam 2 passes through a 45-degree reflective mirror 32 and then it is focused to a point on the test target by another doublet focusing lens L2 36. The two outgoing light beams and two returning object beams are off-axially incident to different positions on the two focusing lenses L1 26 and L2 36. The two returning object beams remain linearly polarized and are orthogonal with respect to each other after they are recombined at PBS1 20. Before the two returning object beams pass through a quarter waveplate QW 45, 4% of the light beam is split by a non-polarization beamsplitter NPBS 40 for light beam alignment use. One right circularly polarized light beam and one left circularly polarized light beam are generated after the two returning object beams traverse the quarter waveplate QW 45 oriented at 45 degrees. The sum vector of the two circularly polarized light beams is still a linearly polarized light beam but with an inclined angle relative to a horizontal axis due to the movement of the object. Then the resultant linearly polarized light beam is divided into two interfered light beams by another non-polarization beamsplitter NPBS 50. Two polarization beamsplitters PBS3 60 and PBS4 70, whose axes are 45 degrees apart, are utilized to make a 90-degree phase difference of the light intensity measured at respective photodiodes PD1 62, PD2 64 and PD3 72, PD4 74 ideal. Velocity and position signals can be easily decoded by using the aforementioned signal processing schemes.

Mechanical Fixture

Figure 4:
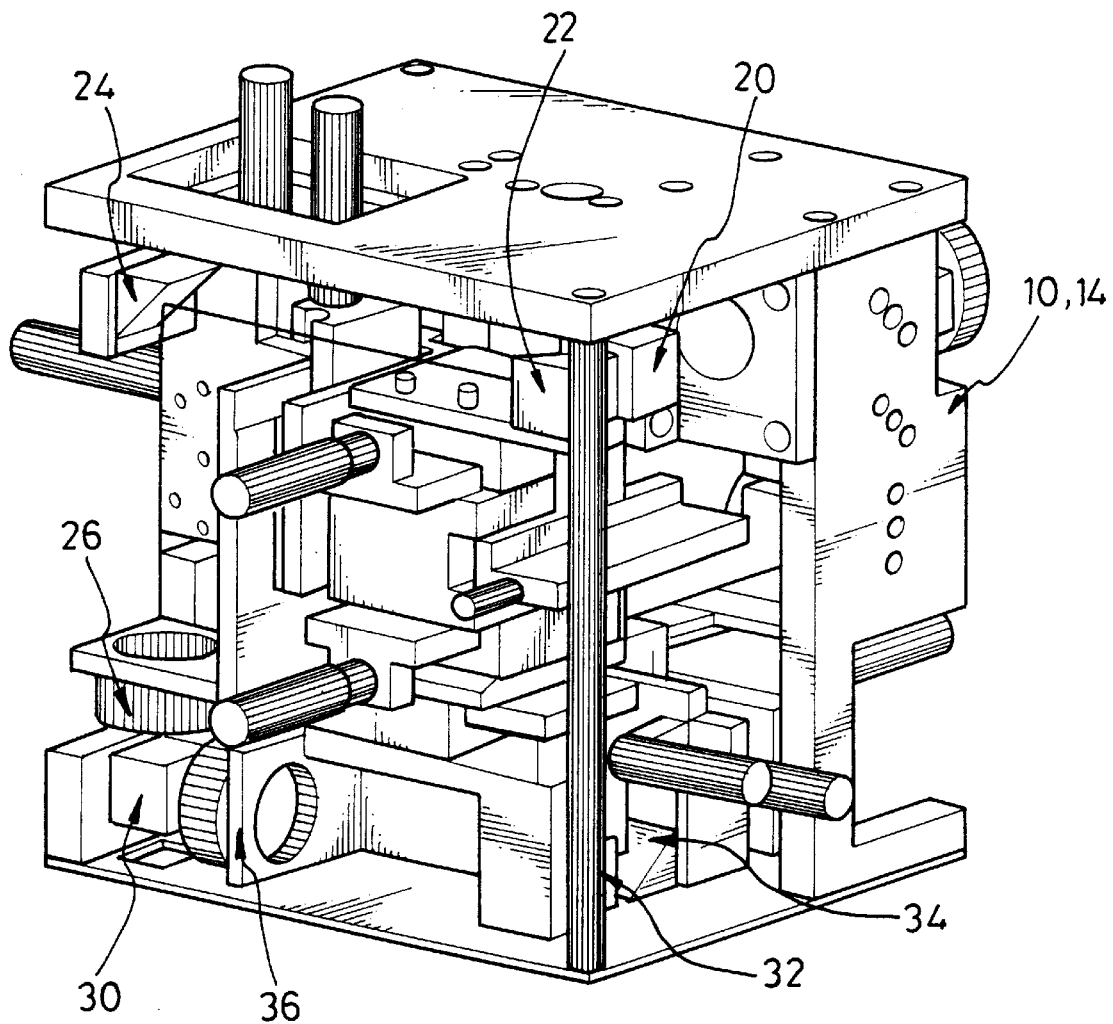
FIG. 4 is a figure showing the mechanical fixture of a laser Doppler interferometer device in accordance with the present invention.

It is a challenging work to construct the fixture to accommodate this three-dimensional optical path for the two object beams. Eight small linear micromovement stages used to control the pitching, rolling and translation of the two interference arms are utilized subtly for miniaturizing the system and for lowering the sensing ability of the positioning mounts caused by thermal or material flunctuations. In this AVID design, the relative thermal deformation among the mounting fixture for the two interference arms plays a dominant role in inducing noises. Therefore, a balanced mechanical design is embedded in this configuration to ensure the thermal stability of the system. Moreover, a single/dual beam changing mechanism for general purposes is provided. This mechanism is a slider mount which carries a retro-reflector to reflect one of the interfered arms when AVID acts as a vibrometer. The mechanical fixture of this laser Doppler interferometer is shown in FIG. 4 where the parts in FIG. 2 are integrated in this mechanical fixture respectively.

Optical alignment and imaging projection System

Figure 5:
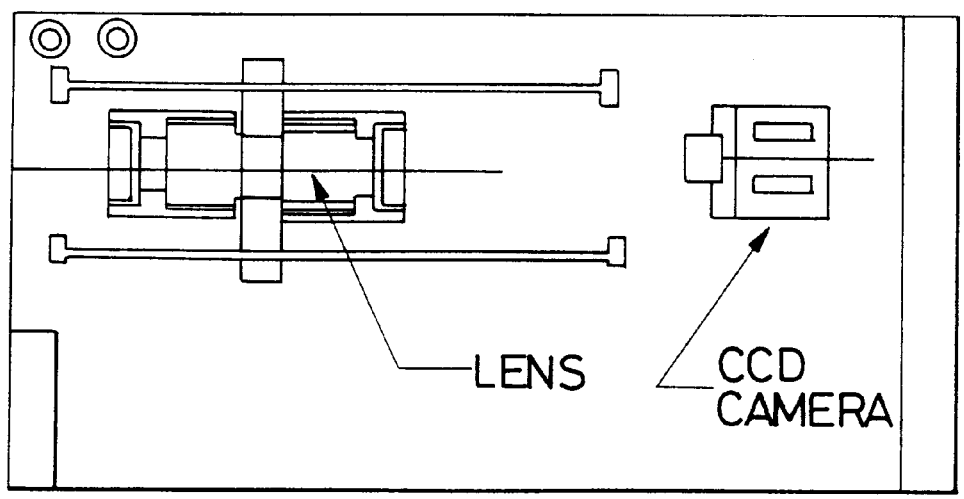
FIG. 5 shows the layout of the built-in optical alignment and imaging projection system.

The built-in micro charged coupled device (CCD) laser light imaging system, which acts like an optical alignment and imaging projection system, is adopted to make the alignment of the optical paths and the target focusing easy. The layout of the optical alignment and imaging projection system is shown FIG. 5. Our adopted imaging system is also a simple optical alignment and imaging projection system which provides light beams positioning and surface imaging with the help of an external light source. This novel optical design in AVID differs from the traditional Doppler interferometers. In addition, the configuration of the built-in optical alignment and imaging projection system provides the user with a way to examine a measurement location in a normal viewing angle, which is important for a miniature system measurement or a high precision measurement.

Processing of Differential Quadrature Signals

From the above description, it has been shown that the quadrature sinusoidal signals are detected from a pair of photodiodes. The quadrature signals always contain the variable dc level and sinusoidal components. The problem lies in the variable dc level which disables the counting circuits. This problem can be overcome by removing the average dc level. This can be achieved by an electronic subtraction process that removes the average dc level from the quadrature signals. In order to achieve this objective, a pair of polarized beamsplitters and four photodiodes have been designed into the system to produce four signals instead of the normal two. In AVID, the normal two signals are each divided into two by rotating one of the two polarizing beamsplitters, which then spaced in phase by $\pi/4$. The four electronic output signals spaced by $\pi/2$ are obtained from the amplifiers of the photodiodes. The four quadrature signals can be expressed as:

$$I_1 [1+\sin(2\pi(f_{d1}-f_2)t+\phi)]$$

$$I_2 [1+\cos(2\pi(f_{d1}-f_2)t+\phi)]$$

$$I_3 [1+\sin(2\pi(f_{d1}-f_2)t+\phi)]$$

$$I_4 [1+\cos(2\pi(f_{d1}-f_2)t+\phi)]$$

Using $I_1$, $I_3$ and $I_2$, $I_4$, at which subtraction operations are performed, the two modified differential signals of $(I_1-I_3)$ and $(I_2-I_4)$ have zero average levels. After the two signals are modified and shaped by the pre-amplifier and post-amplifier, the quality of the signals can be increased. Thus the signal-to-noise ratio for phase demodulation can be achieved.

Analog Processing of Signals for Phase and Frequency Demodulation

The modified differential signals of $(I_1-I_3)$ and $(I_2-I_4)$ are put into rectangular form by Schmidt triggers. The shaped signals are represented by the two digital states 1 and 0. Simultaneously putting the two sinusoidal quadrature signals into a pulse generator, the four zero crossings from the quadrature signals then yield four pulses per cycle. With the four pulses produced, the smallest count (i.e. resolution) lambda/8 can be achieved and lambda is the wavelength of the laser light. The integer count can then be obtained and converted into displacement by multiplying it by lambda/8.

If a situation occurs where a high accuracy and resolution is needed, a subdivision count needs to be added. In general the subdivision count for a phase variation less than 90° (i.e. corresponding to lambda/8 displacement) can be demodulated by the phase fine-division technique. Then, the summation of the total count and subdivision count is the net phase change induced by the motion of the object. As such, the net displacement of the object can be converted from a net phase change. The sequence of the phase leading of the two signals state is representative of the motion of the object. In order to identify the motion direction of the object, the pulse train can be put into the up-counter and down-converter. The identification of the direction of motion and total pulse count in each direction can be obtained on these two chips. The velocity of the moving object is also an important physical quantity especially in the application of the positioning stage. Two sinusoidal quadrature signals from the detectors are mixed with another electronically generated cosine and sine signals with frequency $f_c$ separately. Sending this signal into a simple frequency-to-voltage converter will yield the velocity signal due to the Doppler effect. Thus both velocity and displacement can be measured by this AVID differential laser Doppler interferometer.

Digital Signals Phase Decoding Algorithm

The modified differential signals of $(I_1-I_3)$ and $(I_2-I_4)$ are amplified and shaped by the circuit board. These two signals are put into an analog-to-digital converter (ADC). If all external and internal errors are ignored, the two outputs will have identical amplitude and differ by 90° phase angle. Plotting these two signals P, Q versus each other on a X-Y plane, a Lissajous graph displacing a full cycle of circles is formed. Decoding the angle for any specific point on this circle is known as the P/Q signal encoding. In fact, both P and Q typically do not have identical amplitude nor exactly 90 degrees phase difference due to sample surface conditions, experimental conditions, and external noises in real experimental conditions. The Lissajous figure becomes an ellipse with titled axes. When adding noise influences into the phase signal demodulation, a random error will occur. Another viewpoint related to the metrology philosophy should be noted, which is, every point on a circle is identical in terms of measurement accuracy, yet elliptical points located on neighboring minor-axes, can be decoded more accurately than those point located closer to the major-axes. A conventional P/Q signal decoding algorithm neglects this effect, which may result in a significant precision error for our AVID differential measurement system. Experience has shown that the shape of the ellipse will remain unchanged during the same measurement condition, i.e. same specimen, same temperature, same humidity, etc. A new algorithm that overcomes the above drawback is thus developed. This algorithm circumvents the unequal accuracy problem by transforming the ellipse to a corresponding normalized circle. As the total measurement range in many applications such as the magnetic head flying height is far less than full Lissajous circle, a standard sinusoidal motion was adopted to create the full cycle pattern with a built-in PZT (lead-zirconate-titanate) self-calibration mechanism in the AVID system. This calibration mechanism is composed of a PZT rod located within one of the interference arms of the AVID.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

We claim:

1. An optical measuring device, comprising at least:
   a laser source for generating a linearly polarized laser light beam;
   a first polarization beamsplitter for dividing said laser light beam into a first outgoing light beam and a second outgoing light beam, and combining a first returning light beam and a second returning light beam to form a single returning light beam;
   a rotatable mount for varying the intensities of said two outgoing light beams;
   a first 45-degree reflective mirror for reflecting said first outgoing light beam and said first returning light beam to turn 90 degrees;
   a second 45-degree reflective mirror for reflecting said first outgoing light beam and said first returning light beam to turn 90 degrees;
   a third 45-degree reflective mirror for reflecting said second outgoing light beam and said second returning light beam to turn 90 degrees;
   a fourth 45-degree reflective mirror for reflecting said second outgoing light beam and said second returning light beam to turn 90 degrees;
   a second polarization beamsplitter for rotating one of said two outgoing light beams and one of said two returning light beams to turn 90 degrees;
   a polarization state independent light beam sampling plate for splitting a portion of said single returning light beam;
   a projecting lens and an imaging device for facilitating the alignment of said two returning beams;
   a quarter waveplate for rotating each of the polarization states of said two returning light beams by 90 degrees to an opposite state;
   a non-polarization beamsplitter for dividing each of said returning light beams with polarization states rotated by said quarter waveplate into a first receiving light beam and a second receiving light beam;
   a third polarization beamsplitter for dividing said first receiving light beam into two light beams, and transmitting said two split light beams to two photodiodes respectively for position signal, velocity signal, and both position and velocity signals decoding; and
   a fourth polarization beamsplitter for dividing said second receiving light beam into two light beams, and transmitting said two split light beams to two photodiodes respectively for position signal, velocity signal, and both position and velocity signals decoding.

2. An optical measuring device as claimed in claim 1, wherein each of said first, second, third and fourth 45-degree reflective mirrors is mounted on a moving device for fine tuning and auto-calibration.

3. An optical measuring device as claimed in claim 1, wherein said laser source has a polarization state being rotated to adjust a relative intensity of said two outgoing light beams split by said first polarization beamsplitter.

4. An optical measuring device as claimed in claim 1, further comprising a lens for focusing said first outgoing light beam to a measuring specimen.

5. An optical measuring device as claimed in claim 1, further comprising a lens for focusing said second outgoing light beam to a measuring specimen.

6. An optical measuring device as claimed in claim 2, wherein said moving device is substantially a micromovement stage.

7. An optical measuring device as claimed in claim 1, further comprising a reflective and shift optical device for reflecting one of said first outgoing light beam and said second outgoing light beam back to a respective photodiode for measurement.

8. An optical measuring device as claimed in claim 7, wherein said reflective and shift optical device is substantially a corner cube.

9. An optical measuring device as claimed in claim 7, wherein said reflective and shift optical device is substantially a prism.

10. An optical measuring device, comprising at least:

a laser source for generating a linearly polarized light beam;

a first polarization beamsplitter for dividing said laser light beam into a first outgoing light beam and a second outgoing light beam and combining a first returning light beam and a second returning light beam to form a single returning light beam;

a first 45-degree reflective mirror for reflecting said first outgoing light beam and said first returning light beam to turn 90 degrees;

a second 45-degree reflective mirror for reflecting said first outgoing light beam and said first returning light beam to turn 90 degrees;

a third 45-degree reflective mirror for reflecting said second outgoing light beam and said second returning light beam to turn 90 degrees;

a second polarization beamsplitter for rotating one of two said outgoing light beams and one of said two returning light beams 90 degrees;

a polarization state independent light beam sampling plate for splitting a portion of said single returning light beam;

a projecting lens and an imaging device for facilitating the alignment of said two returning beams;

a quarter waveplate for rotating each of the polarization states of said returning object beams by 90 degrees to an opposite state;

a non-polarization beamsplitter for dividing each of said returning light beams with polarization states rotated by said quarter waveplate into a first receiving light beam and a second receiving light beam;

a third polarization beamsplitter for dividing said first receiving light beam into two split light beams, and transmitting said two split light beams to two photodiodes respectively for position signal, velocity signal and both position and velocity signals decoding; and a fourth polarization beamsplitter for dividing said second receiving light beam into two split light beams, and transmitting said two split light beams to two photodiodes respectively for position signal, velocity signal and both position and velocity signals decoding.

11. An optical measuring device as claimed in claim 10, wherein each of said first, second, third and fourth 45-degree reflective mirrors is mounted on a moving device for fine tuning and auto-calibration.

12. An optical measuring device as claimed in claim 10, wherein said laser source has a polarization state being rotated to adjust a relative intensity of said two outgoing light beams split by said first polarization beamsplitter.

13. An optical measuring device as claimed in claim 10, further comprising a lens for focusing said first outgoing light beam to a measuring specimen.

14. An optical measuring device as claimed in claim 10, further comprising a lens for focusing said second outgoing light beam to a measuring specimen.

15. An optical measuring device as claimed in claim 11, wherein said moving device is substantially a micromovement stage.

\* \* \* \* \*